(12) United States Patent
Awasthi et al.

(10) Patent No.: US 12,399,845 B2
(45) Date of Patent: Aug. 26, 2025

(54) MEMORY ORGANIZATION AND ACCESS FOR EFFICIENT MATRIX OPERATIONS

(71) Applicant: QUALCOMM Incorporated, San Diego, CA (US)

(72) Inventors: Aditya Awasthi, San Diego, CA (US); Tsung-Han Yu, Lake Forest, CA (US); Troy Li, Irvine, CA (US); Sundar Rajan Balasubramanian, Groton, MA (US); Ankita Nayak, Milpitas, CA (US); Leiter Kang, Somerville, MA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 18/192,033

(22) Filed: Mar. 29, 2023

(65) Prior Publication Data

US 2024/0330212 A1 Oct. 3, 2024

(51) Int. Cl.
*G06F 13/16* (2006.01)
*G06F 15/173* (2006.01)

(52) U.S. Cl.
CPC ...... *G06F 13/1657* (2013.01); *G06F 13/1668* (2013.01); *G06F 15/17375* (2013.01)

(58) Field of Classification Search
CPC ............. G06F 13/1657; G06F 13/1668; G06F 15/17375
See application file for complete search history.

(56) References Cited

U.S. PATENT DOCUMENTS 12,020,035 B2 * 6/2024 Parle ..................... G06F 9/3887
12,141,082 B2 * 11/2024 Minkin ............... G06F 12/0813
2013/0268715 A1 * 10/2013 Fetterman ............. G06F 9/3888
  711/E12.078
2013/0286706 A1 * 10/2013 Perego .................... G06F 12/04
  365/230.03
2022/0137866 A1 * 5/2022 Kim ..................... G11C 11/4076
  711/154

OTHER PUBLICATIONS

International Search Report and Written Opinion—PCT/US2024/013573—ISA/EPO—May 31, 2024.
Aho E., et al., "Parallel Memory Architecture for Arbitrary Stride Accesses", 2006 IEEE Design and Diagnostics of Electronic Circuits and Systems, Prague, Czech Republic, Apr. 18-21, 2006, 6 Pages.

* cited by examiner

Primary Examiner — Henry Tsai
Assistant Examiner — Christopher A Daley
(74) Attorney, Agent, or Firm — Patterson + Sheridan LLP

(57) ABSTRACT

Certain aspects of the present disclosure provide techniques and apparatus for efficiently accessing memory in a computing system. An example method includes organizing a plurality of physical memory banks having a base size into a plurality of logical memory banks. A request to execute operations on the plurality of physical memory banks is received. The request to execute the operations comprises a request to interact with data having a sample width based on the base size. Responsive to receiving the request to execute the operations, the operations are executed on one or more logical memory banks of the plurality of logical memory banks via a memory crossbar shared across the plurality of logical memory banks. An amount of the data on which the operations are executed is a multiple of the sample width, and each logical memory bank has a size based on the base size and a multiplier value.

19 Claims, 12 Drawing Sheets

400

```
for (eu_idx = 0 : 63) begin
  rd_addr_raw[eu_idx] = index_0 + eu_idx*stride; // (stride == odd*2^type_k for
stride read)
end for (eu_idx = 0 : 63) begin
  bid[eu_idx] = (rd_addr_raw[eu_idx][0 +: 6] ^ rd_addr_raw[eu_idx][type_k +: 6]);
end
```

402

```
for (eu_idx = 0 : 63) begin
  case (num_of_bank)
    B64: // B64 = $clog2(64) = 6
      rd_line[eu_idx] = (rd_addr_raw[eu_idx] >> B64); //
      rd_bank[eu_idx] = bid[eu_idx][0 +: B64];
    B32: // B32 = $clog2(32) = 5
      floor(rd_addr_raw[eu_idx]/64);
      rd_line[eu_idx] = (rd_addr_raw[eu_idx] >> B32); //
      rd_bank[eu_idx] = bid[eu_idx][0 +: B32];
    B16: // B16 = $clog2(16) = 4
      floor(rd_addr_raw[eu_idx]/32);
      rd_line[eu_idx] = (rd_addr_raw[eu_idx] >> B16); //
      rd_bank[eu_idx] = bid[eu_idx][0 +: B16];
    B08: // B08 = $clog2(8) = 3
      floor(rd_addr_raw[eu_idx]/16);
      rd_line[eu_idx] = (rd_addr_raw[eu_idx] >> B08); //
      rd_bank[eu_idx] = bid[eu_idx][0 +: B08];
  endcase
End
```

404

```
// B64 :: 64 banks, 1024/64=16 bits per bank
// B32 :: 32 banks, 1024/32=32 bits per bank
// B16 :: 16 banks, 1024/16=64 bits per bank
// B08 :: 8 banks, 1024/8=128 bits per bank
// adjust rd_bank so that all modes could use 64x64 omega xbar
for (eu_idx = 0 : 63) begin
  case (num_of_bank)
    B64: // B64 = $clog2(64) = 6
      rd_line_adj[eu_idx] = rd_line[eu_idx>>(6-B64)];
      rd_bank_adj[eu_idx] = rd_bank[eu_idx>>(6-B64)];
    B32: // B32 = $clog2(32) = 5
      rd_line_adj[eu_idx] = rd_line[eu_idx>>(6-B32)];
      rd_bank_adj[eu_idx] = rd_bank[eu_idx>>(6-B32)] + eu_idx[0 +: (6-B32)]; // (6-B32) = 1
    B16:
      rd_line_adj[eu_idx] = rd_line[eu_idx>>(6-B16)];
      rd_bank_adj[eu_idx] = rd_bank[eu_idx>>(6-B16)] + eu_idx[0 +: (6-B16)]; // (6-B16) = 2
    B08:
      rd_line_adj[eu_idx] = rd_line[eu_idx>>(6-B08)];
      rd_bank_adj[eu_idx] = rd_bank[eu_idx>>(6-B08)] + eu_idx[0 +: (6-B08)]; // (6-B08) = 3
  endcase
end
```

406

```
for (eu_idx = 0 : 63) begin
  rd_euid_adj[eu_idx] = eu_idx;
end
rd_line_arr = omega_xbar(rd_line_adj, rd_bank_adj);
rd_euid_arr = omega_xbar(rd_euid_adj, rd_bank_adj);

for (bk_idx = 0 : 63) begin
  rd_addr[bk_idx*aw +: aw] = rd_line_arr[bk_idx]; // aw represents addr width
  rd_data_adj[bk_idx] = mem_dout[bk_idx*16 +: 16];
end
rd_data_arr = omega_xbar(rd_data_adj, rd_euid_arr);
for (eu_idx = 0 : 63) begin
  rd_data[eu_idx*16 +: 16] = rd_data_arr[eu_idx];
end
out[] = omega_xbar (in[], mux_sel[])
```

502
```
//Generate linear wr idx for 64x16words + rd offset, N= #of banks, K= cat/type and no stride write
//linear write wr_addr generation per bank
//line_address[i] = floor(n/N) = word_addr[i][BANK_SEL_WIDTH+:LINE_ADDR_WIDTH];
always_comb begin : proc_bk_sel_mod
    wr_addr_next    = wr_addr_reg + 1;

for (int i=0; i<NUM_PHY_BANKS; i=i+1) begin
        wr_idx_linear[i] = wr_addr_cnt*NUM_PHY_BANKS + i;

case(mode)
            MODE_64BK : wr_idx_adj[i] = wr_idx_linear[i][BK_SEL_WIDTH*2-1:0];
            MODE_32BK : wr_idx_adj[i] = {1'b0,wr_idx_linear[i][BK_SEL_WIDTH*2-1:1]};
            MODE_16BK : wr_idx_adj[i] = {2'b0,wr_idx_linear[i][BK_SEL_WIDTH*2-1:2]};
            MODE_8BK  : wr_idx_adj[i] = {3'b0,wr_idx_linear[i][BK_SEL_WIDTH*2-1:3]};
            default   : wr_idx_adj[i] = {4'b0,wr_idx_linear[i][BK_SEL_WIDTH*2-1:4]};
        endcase wr_idx_shift[i] = wr_idx_adj[i] >> type_k;
    end
end
```

504
```
//bank_sel[i] = bk_sel_linear[i][0+:BANK_SEL_WIDTH-1] ^ bk_sel_linear[i][K+:BANK_SEL_WIDTH-1];
always_comb begin : proc_addr_bk_sel_gen for (int i=0; i<NUM_PHY_BANKS; i=i+1) begin
        bk_sel_mod[i]    = wr_idx_adj[i][BK_SEL_WIDTH-1:0] ^ wr_idx_shift[i][BK_SEL_WIDTH-1:0];

case(mode)
            MODE_64BK : bk_sel_dst[i] = bk_sel_mod[i];
            MODE_32BK : bk_sel_dst[i] = {bk_sel_mod[i][BK_SEL_WIDTH-2:0], 1'(i%2)}; //optimize modulo op later
            MODE_16BK : bk_sel_dst[i] = {bk_sel_mod[i][BK_SEL_WIDTH-3:0], 2'(i%4)};
            MODE_8BK  : bk_sel_dst[i] = {bk_sel_mod[i][BK_SEL_WIDTH-4:0], 3'(i%8)};
            default   : bk_sel_dst[i] = bk_sel_mod[i][BK_SEL_WIDTH-1:0];
        endcase data_xbar_in[i*DATA_WIDTH_XBAR +: DATA_WIDTH]        = data_in[i*DATA_WIDTH +: DATA_WIDTH];
        data_xbar_in[i*DATA_WIDTH_XBAR + DATA_WIDTH +: BK_SEL_WIDTH] = bk_sel_dst[i][BK_SEL_WIDTH-1:0];
        wr_data_out[i*DATA_WIDTH +: DATA_WIDTH]              = data_xbar_out[i*DATA_WIDTH_XBAR +: DATA_WIDTH];
    end
end
```

MEMORY ORGANIZATION AND ACCESS FOR EFFICIENT MATRIX OPERATIONS

INTRODUCTION

Machine learning is generally the process of producing a trained model (e.g., an artificial neural network, a tree, or other structures), which represents a generalized fit to a set of training data. Applying the trained model to input data produces inferences, which may be used to gain insights into the input data. In some cases, applying the model to the input data is described as "running an inference" or "performing an inference" on the input data.

To train a model and perform inferences on input data, various mathematical operations are performed using various mathematical processing components. For example, multiply-and-accumulate (MAC) units may be used to perform these operations to train a model and perform inferences on input data using the trained model. It should be noted, however, that MAC units may be used for various mathematical operations and are not so limited to use in mathematical operations related to training a model and performing inferences on input data. These mathematical operations are generally performed with respect to one or more matrices; for example, these mathematical operations may include matrix-to-vector multiplication operations and matrix-to-matrix multiplication operations.

Generally, the data stored in input matrices on which mathematical operations are performed and the data stored in output matrices generated by these mathematical operations are stored in a consistent format (e.g., in row major order, in which consecutive elements of a row of a matrix reside next to each other, or in column major order, in which consecutive elements of a column of a matrix reside next to each other). However, samples used in matrix operations (e.g., convolution operations in a machine learning model or the like) may be accessed in a specific order different from the order in which such data is stored in memory. Thus, to access data involved in matrix operations, various actions may be performed, such as sample packing or unpacking or data rearrangement, to allow for relevant samples to be obtained from or written to memory. These actions, however, impose various processing and power overheads and may increase the amount of time involved in performing various mathematical operations used in training a machine learning model and generating inferences using a machine learning model.

Accordingly, what is needed are improved techniques for performing matrix operations more efficiently.

BRIEF SUMMARY

Certain aspects of the present disclosure provide a method for efficiently accessing memory in a computing system. An example method includes organizing a plurality of physical memory banks having a base size into a plurality of logical memory banks. A request to execute operations on the plurality of physical memory banks is received. Generally, the request to execute the operations comprises a request to interact with data having a sample width based on the base size. Responsive to receiving the request to execute the operations, the operations are executed on one or more logical memory banks of the plurality of logical memory banks via a memory crossbar shared across the plurality of logical memory banks. Generally, an amount of the data on which the operations are executed is a multiple of the sample width, and each logical memory bank of the one or more logical memory banks has a size based on the base size and a multiplier value.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict only certain aspects of this disclosure and are therefore not to be considered limiting of the scope of this disclosure.

FIG. 4 illustrates pseudocode for reading data from memory organized using logical memory banks based on a variable data width and variable stride length, according to aspects of the present disclosure.

FIG. 5 illustrates pseudocode for writing data to memory organized using logical memory banks based on a variable data width and variable stride length, according to aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure provide apparatus, methods, processing systems, and computer-readable mediums for organizing and accessing memory for efficient matrix operations (e.g., in training and inferencing using machine learning models).

As discussed, many operations performed while training or inferencing using a machine learning model involve matrix operations, such as multiplication operations that result in the generation of a vector from a matrix or multiplication operations that result in the generation of a matrix from another matrix of data. These operations generally involve accessing samples of data from memory, which may not be organized in a manner conducive to accessing the samples of data on which these operations are to be performed. Thus, to allow for these samples in memory to be accessed, various operations to move or otherwise rearrange data in memory (also known as sample packing or unpacking) may be performed. These operations may use significant amounts of processing time, which may delay the commencement of operations performed on the samples accessed from memory. Further, moving or rearranging data in memory generally consumes some amount of power, which may impact the amount of energy that remains (e.g., in a battery or other energy storage device from which a processor draws power to operate) for other operations.

Aspects of the present disclosure provide techniques for organizing and accessing data in memory that allow for efficient access to data samples in memory and accelerate the process of accessing data for use in various matrix operations, such as those involved in training a machine learning model or inferencing operations using a machine learning model. As discussed in further detail herein, physical memory may be organized into a plurality of logical memory banks having a base size and accessible via a memory crossbar shared across the plurality of logical memory banks. Incoming requests to interact with data may have a sample width that is based on the base size, and the appropriate number of logical memory banks can be accessed to retrieve data from or write data to memory. By doing so, aspects of the present disclosure allow for an arbitrary number of contiguous samples of data in memory, with arbitrarily sized gaps (also known as a stride interval) between these samples, to be accessed in order to provide data to a processor for use in performing mathematical or other operations based on these samples. Because arbitrary numbers of contiguous samples of data can be accessed with arbitrarily sized stride intervals, aspects of the present disclosure may allow for data to be accessed without data sample packing or unpacking, which may reduce computational expense and power utilization involved in rearranging and moving data in memory to accommodate data access operations on arbitrary numbers of samples and arbitrary stride lengths.

Introduction to Accessing Data in Memory

Figure 1:
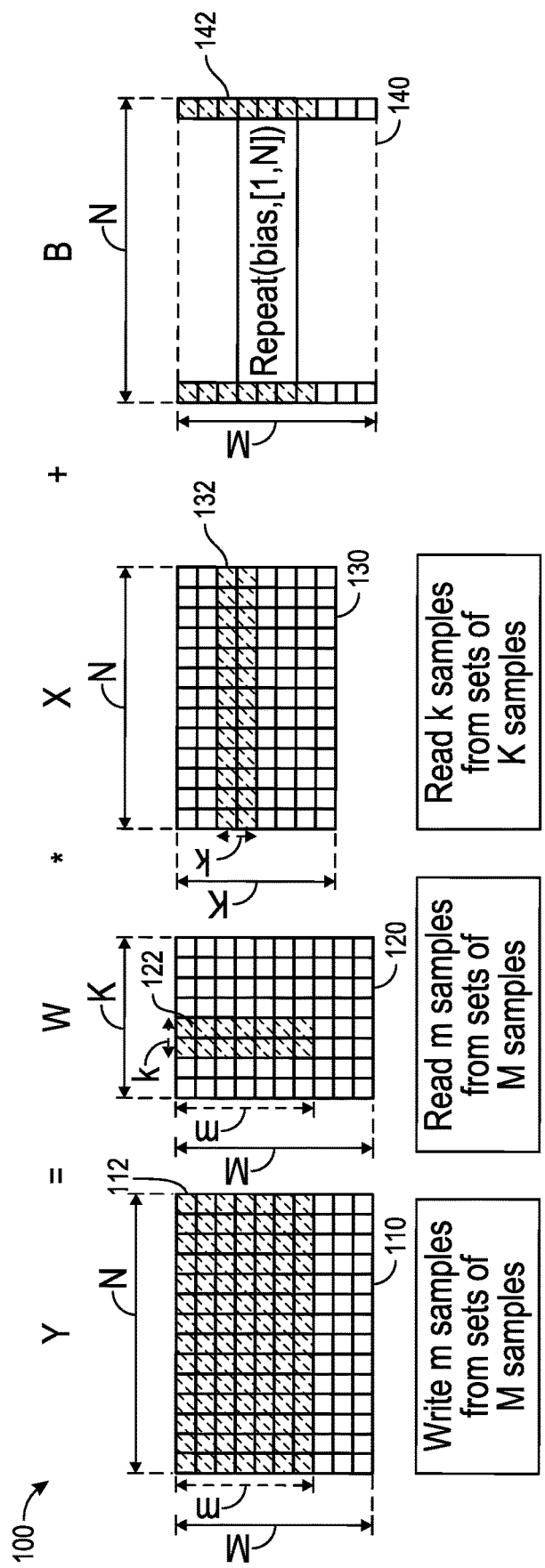
FIG. 1 illustrates an example data access pattern for performing matrix operations in a fully connected layer of a machine learning model.

FIG. 1 illustrates an example 100 of accessing data in memory (e.g., during machine learning operations, such as training a machine learning model or inferencing using a trained machine learning model) based on different stride lengths between data samples. As illustrated, example 100 illustrates the calculation of matrix Y 110 based on samples W 120, X 130, and B 140. As illustrated, sample W 120 is a matrix with dimensions M×K, sample X 130 is a matrix with dimensions K×N, and sample B 140 is a matrix with dimensions M×N.

During a particular clock cycle, a processor generally accesses different portions of matrices including relevant samples of data. For example, during a given clock cycle, a processor can access a subsample 122 with dimensions m×k, m∈M and k∈K, from sample W 120. Likewise, the processor can access a subsample 132 with dimensions k×N from sample X 130 and can access a subsample 142 with dimensions m×N from sample 140. The resulting sum of subsample 142 and the product of the subsamples 122, 132 from sample W 120 and from sample X 130 may be a matrix 112 with size m×N.

To access each subsample 122, 132, and 142, some amount of memory may be read, and intervening memory need not be read. For example, to access the m×k subsample 122 from sample W 120, the processor may read some elements from the third column of data, skip the remaining elements from the third column of data, then read some elements from the fourth column of data, and skip the remaining elements from the fourth column of data. Similarly, to access the k×N subsample 132 from sample X 130, the processor may read some elements from each column of data and skip the remaining elements from each column of data. If the memory is organized in a column-major format, then retrieving the subsample 122 from sample W 120 may be represented as an access of m consecutive samples with a stride length of M−m, while retrieving the subsample 132 from sample X 130 may be represented as an access of k consecutive samples with a stride length of K−k and an offset of 2.

Data access patterns 150 and 160 illustrate examples of data access patterns in general matrix multiply (GEMM) operations in a fully connected layer of a neural network with rank-k updates (where the rank parameter corresponds to an amount of information flowing between layers of the neural network) without and with a beginning offset applied to the data access pattern, respectively. It should be recognized that the m and M parameters illustrated in data access pattern 150 may or may not be different from those illustrated in matrix Y 110, and the k and K parameters illustrated in data access pattern 160 may be different from those illustrated in sample X 130. As illustrated, data access pattern 150 illustrates accessing m ∈ M samples from memory with no starting offset. With m=8 and M=16, it can be seen that within each sixteen-element sample (e.g., a first sample with indices 0 through 15, or a second sample with indices 16 through 31), the first eight elements are accessed (read from or written to), and the remaining eight elements are skipped. Similarly, data access pattern 160 illustrates accessing k∈K samples from memory, but with a starting offset of 4 elements. With k=4, K=12, and the starting offset of 4, it can be seen that memory access does not start until element 4 (e.g., skips elements 0 through 3). Subsequently, for every block of 12 samples, a processor can access the first four samples and skip the remaining eight samples.

Example Arbitrary Stride Access in Memory

To support accessing arbitrarily sized samples in memory and arbitrary stride lengths between accessed samples in memory, aspects of the present disclosure use a parallel memory architecture that allows a processor to request access to data in a number of parallel memory modules.

Figure 2:
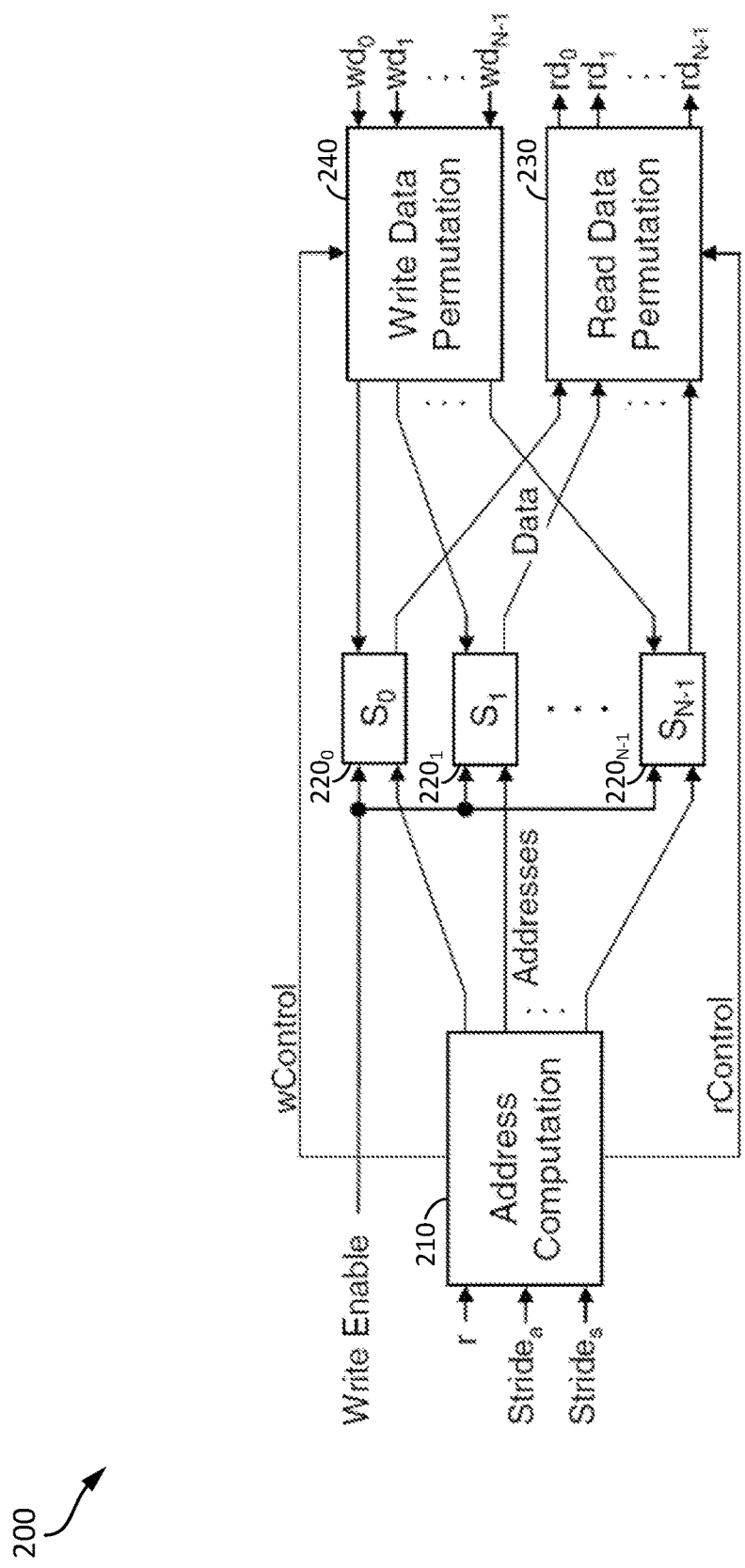
FIG. 2 illustrates an example memory access architecture for accessing samples in memory according to a defined offset and stride length.

FIG. 2 illustrates a memory access architecture 200 that allows for accessing arbitrarily sized samples of data in memory with arbitrary stride lengths between these samples of data. Memory access architecture 200 generally includes an address computation block 210 that generates a set of addresses identifying memory blocks 220 from which data is to be accessed (e.g., read from or written to). To generate the set of addresses, address computation block 210 uses three inputs: r, corresponding to a starting offset and identifying the initial location from which data is to be accessed, $Stride_a$, corresponding to a stride length, and $Stride_s$, corresponding to a skewing scheme defining how data is to be permuted for access.

Read data permutation block 230 and write data permutation block 240 are configured, respectively, to read data from or write data to the addresses associated with memory blocks 220 generated by address computation block 210. In some aspects, read data permutation block 230 and write data permutation block 240 can be controlled (e.g., activated or deactivated) using the rControl and wControl signals from address computation block 210, respectively. If the rControl is set to a value that activates the read data permutation block 240, then read data permutation block 230 can retrieve data from N memory blocks $220_0$ through $220_{N-1}$ as N data bits $rd_0$ through $rd_{N-1}$, respectively, and output these data bits to a processor for processing. If the write enable bit is set to a logical high, and wControl activates the write data permutation block 240, then N data bits $wd_0$ through $wd_{N-1}$ may be written to memory blocks $220_0$ through $220_{N-1}$, respectively.

Generally, memory access architecture 200 allows for memory addresses to be accessed according to a defined skewing scheme. Memory access architecture 200 allows for a data sample to be accessed, and then a subsequent data sample may be accessed after a hop over some amount of data from the previously accessed data sample. However, in many applications, such as training and inferencing using machine learning models, data samples of variable lengths (instead of a single data sample of a standardized length) may be processed in matrix operations, and variable stride lengths may be used to access the appropriate data samples. For example within a machine learning model, different layers may have differently sized inputs, outputs, and/or filters, which may involve the use of different memory access parameters, even though input and output matrices may be organized in a consistent format.

To allow for efficient memory access that provides for accessing variable amounts of data in memory using variable stride lengths, aspects of the present disclosure provide techniques for partitioning or otherwise organizing memory into different logical memory banks that map to underlying physical memory banks. A single memory crossbar may be used to access one or more physical memory banks according to a number of memory samples over which data is to be accessed. To allow for arbitrary amounts of data (e.g., arbitrary sample widths) to be accessed, aspects of the present disclosure provide techniques to allow for a consecutive number of samples m to be accessed from arbitrarily sized sets of M data samples, so long as M is a multiple of m (i.e., so long as M mod m=0).

Figure 3:
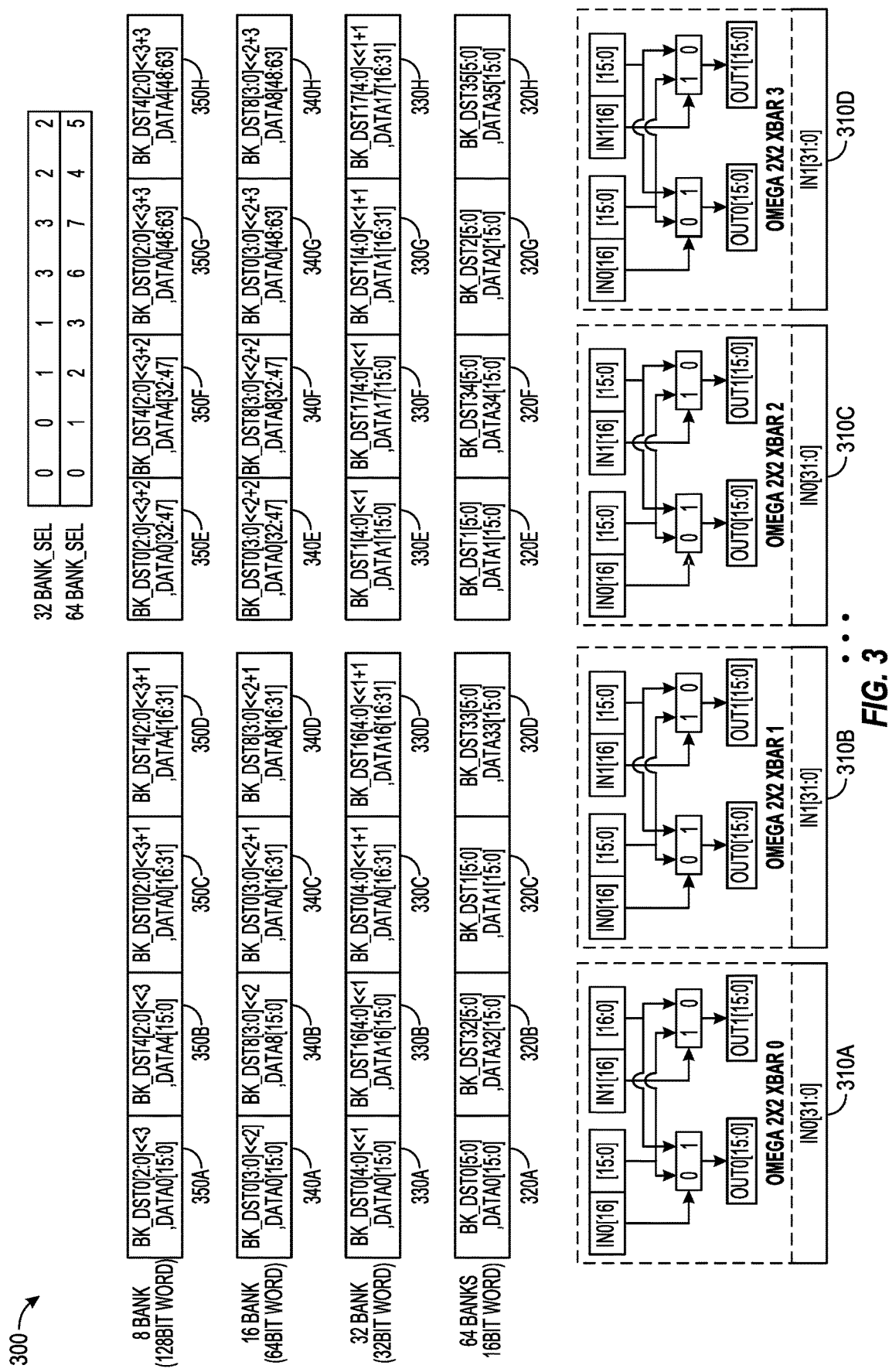
FIG. 3 illustrates an example memory access architecture for accessing variable amounts of data at variable stride lengths using logical memory banks, according to aspects of the present disclosure.

FIG. 3 illustrates an example memory architecture 300 in which a common memory crossbar allows for access to physical memory banks based on logical memory banks of varying sizes, according to aspects of the present disclosure. As illustrated, memory architecture 300 includes a plurality of physical memory banks 310A, 310B, . . . , 310C, 310D (collectively referred to herein as "physical memory banks 310") sharing a common crossbar. As illustrated, the plurality of physical memory banks 310 may allow for a base amount of memory to be accessed, and each of the logical memory banks may be accessed via one or more of the physical memory banks based on the size of the data being accessed. As illustrated, each memory bank may correspond to a 32-bit storage unit which can output a 32-bit word as two 16-bit words, labeled out0 and out1. The two 16-bit words may be stored in different halves of the 32-bit storage unit (e.g., such that the 16 bits of out0 are stored in a bottom half of the 32-bit storage unit and the 16 bits of out1 are stored in a top half of the 32-bit storage unit, or vice versa). The common memory crossbar may be implemented by the plurality of physical memory banks 310 to allow for arbitrary sample widths to be accessed from memory. For example, as illustrated by memory architecture 300, the common memory crossbar may include the plurality of physical memory banks 310, allowing for multiples of a 16-bit word to be output or retrieved via the appropriate portions of each physical memory bank 310 (which, as discussed, supports two 16-bit words which in combination may be stored in different halves of a 32-bit storage unit).

As discussed, to allow for arbitrary sample widths to be accessed from memory, logical memory banks may have a size that is defined as some multiple of a sample width, subject to the minimum size of a logical memory bank. For example, the size of a logical memory bank may be no smaller than the base width of a physical memory bank, and thus, even if the sample width m is smaller than the base width of the physical memory bank, the minimum amount of data returned from memory may be the amount of data stored in a single physical memory bank.

In this example, each physical memory bank 310 is structured as a plurality of memory sub-banks that outputs a 16-bit data sample (e.g., each output is a sample with bit indices of 0 through 15). Because physical memory banks 310 are configured to output a 16-bit data sample, logical memory banks may be formed as multiple 16-bit samples. Assume, as illustrated in FIG. 3, that memory architecture 300 has a total memory capacity of 1024 bits. A first logical memory bank set 320 may thus include 64 16-bit memory banks, with each of logical memory banks 320A-320H (and others not illustrated) corresponding to a physical memory bank 310. A second logical memory bank set 330 may include half the number of memory banks as first logical memory bank set 320, with each logical memory bank 330A-330H (and others not illustrated) being composed of two logical memory banks in set 320. A third logical memory bank set 340 may include half the number of memory banks as second logical memory bank set 330, with each logical memory bank 340A-340H (and others not illustrated) being composed of two logical memory banks in set 330 (and thus of four logical memory banks in set 320). Finally, a fourth logical memory bank set 350 may include half the number of memory banks as third logical memory bank set 340, with each logical memory bank 350A-350H being composed of two logical memory banks in set 340 (and thus of four logical memory banks in set 330, and ultimately, eight logical memory banks in set 320).

As illustrated, thus, memory architecture 300 allows for different amounts of memory to be accessed using a common memory crossbar. For example, when 32-bit words are selected, index 0 may correspond to indices 0 and 1 for the 16-bit words, index 1 may correspond to indices 2 and 3 for the 16-bit words, and so on. In this case, 16-bit word index 0 may correspond to the bottom half of the word at 32-bit word index 0, and 16-bit word index 1 may correspond to the top half of the word at 32-bit word index 0 (or vice-versa), and so on. By doing so, aspects of the present disclosure allow for memory to be arranged so that dynamic access patterns in terms of both sample width and stride length between samples can change with minimal, or at least reduced, memory reorganization. This support for dynamic access patterns may thus efficiently allow for dynamic sample shuffling and other operations used in training and inferencing operations by various layers of a machine learning model. Further, the common memory crossbar and various logical memory banks that can be supported using the common memory crossbar can allow for efficient memory access with different model dimensions, data bit widths, and underlying accelerator architectures.

FIG. 4 illustrates example pseudocode 400 for reading data from memory organized using logical memory banks based on a variable data width and variable stride length, according to aspects of the present disclosure.

As illustrated, pseudocode 400 begins with block 402 defining different data widths supported by the logical memory banks into which data is organized in memory. In this example, for a memory unit of 1024 bits, identifier B64 defines an operating mode with 64 logical memory banks with a capacity of 16 bits in each bank; identifier B32 defines an operating mode with 32 logical memory banks with a capacity of 32 bits in each bank; identifier B16 defines an operating mode with 16 logical memory banks with a capacity of 64 bits in each bank; and identifier B8 an operating mode with defines 8 logical memory banks with a capacity of 128 bits in each bank. It should be recognized, however, that other bank sizes may also be defined with other capacities, so long as the capacity of a bank is a multiple of a base size (which may correspond to the minimum width of a sample to be retrieved from memory).

Pseudocode 400 may proceed to block 404, in which the logical memory banks are configured to use a common crossbar. At block 404, a read line adjustment and a read bank adjustment are defined for each data width defined in block 402. These adjustments may be performed for each logical memory bank at the smallest size, since larger memory banks may be defined as multiples of smaller memory banks. Thus, as illustrated in pseudocode 400, the read line adjustment and read bank adjustment for each logical memory bank size may be defined in terms of adjustments made so that the read line and read bank adjustments allow for data to be read starting from the correct start point and covering the appropriate number of logical memory banks (e.g., from the B64 mode, corresponding to the smallest-sized logical memory banks in memory).

Finally, pseudocode 400 proceeds to block 406, in which data is read from the common crossbar.

FIG. 5 illustrates example pseudocode 500 for writing data to memory organized using logical memory banks based on a variable data width and variable stride length.

As illustrated, pseudocode 500 begins with block 502 defining different data widths supported by the logical memory banks into which data is organized in memory. In this example, for a memory unit of 1024 bits, identifier MODE_64BK defines an operating mode with 64 logical memory banks with a capacity of 16 bits in each bank; identifier MODE_32BK defines an operating mode with 32 logical memory banks with a capacity of 32 bits in each bank; identifier MODE_16BK defines an operating mode with 16 logical memory banks with a capacity of 64 bits in each bank; and identifier MODE_8BK defines an operating mode with 8 logical memory banks with a capacity of 128 bits in each bank. It should be recognized, however, that other bank sizes may also be defined with other capacities, so long as the capacity of a bank is a multiple of a base size (which may correspond to the minimum width of a sample to be written to memory).

Pseudocode 500 then proceeds to block 504, in which data is written to memory based on the operating mode in which a write operation is to be performed. Block 504 generally identifies, based on an index adjustment and the mode in which operations are being performed, the locations in which data is to be written. As discussed, because larger blocks may be considered as multiple smaller blocks, and because the size of any memory bank is a multiple of the width of the smallest logical memory bank, write operations may be performed on any size of logical memory bank using a common memory crossbar that allows for access to memory based on the width of the smallest logical memory bank.

Figure 6:
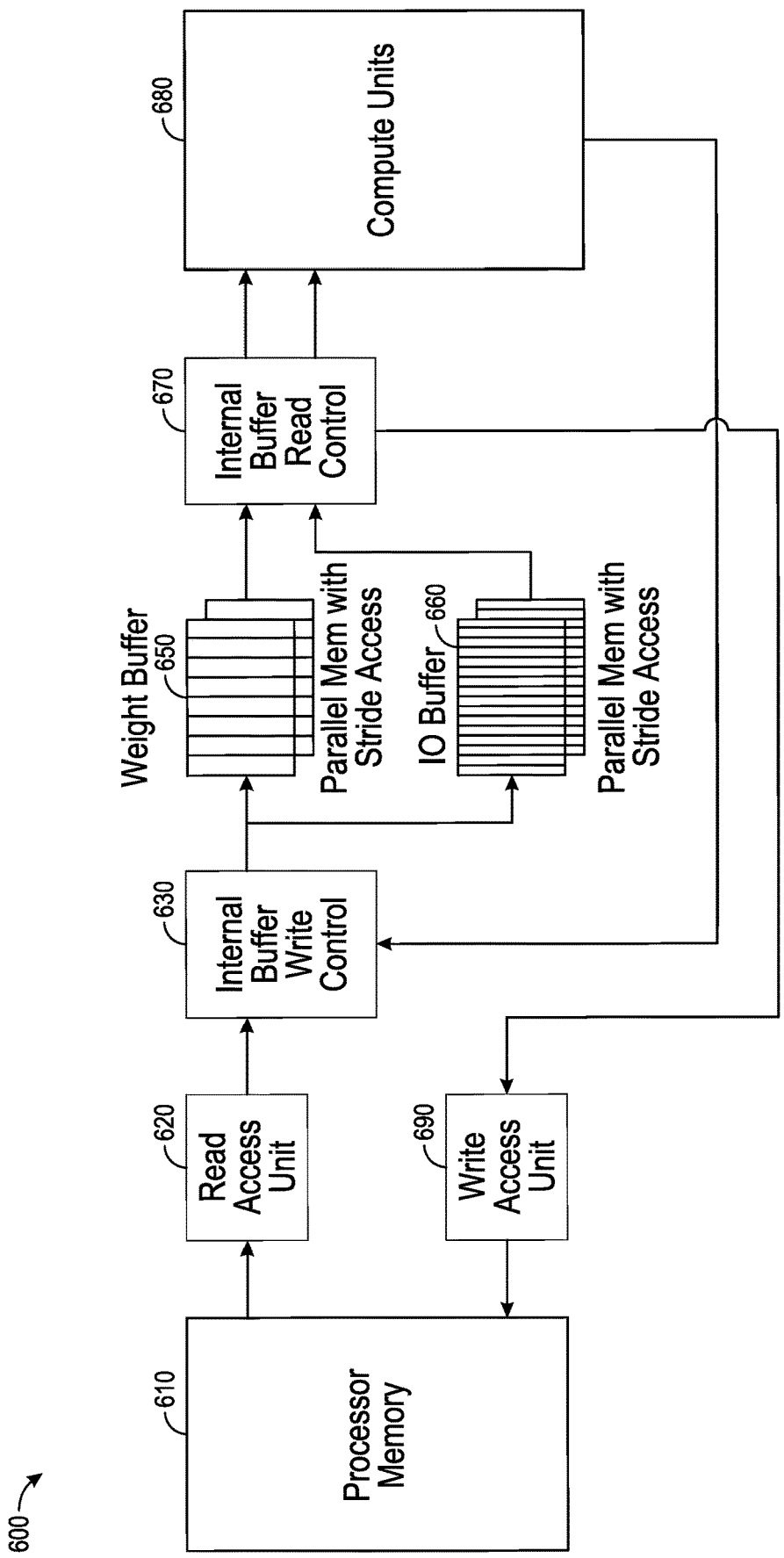
FIG. 6 illustrates an example of memory access using variable data read widths and variable stride lengths via a shared memory crossbar, according to aspects of the present disclosure.

FIG. 6 illustrates an example architecture 600 for memory access using variable data read widths and variable stride lengths via a shared memory crossbar, according to aspects of the present disclosure. Architecture 600 may, for example, be implemented in various compute architectures, such as neural processing units (NPUs) or other machine learning accelerators in which variable data read widths and stride lengths may be used to read data from and write data to memory. As illustrated, architecture 600 includes processor memory 610, from which read access unit 620 accesses and provides data to an internal buffer (one or both of weight buffer 650 and input/output (I/O) buffer 660) controlled by internal buffer write controller 630 and internal buffer read controller 670.

Generally, read access unit 620, weight buffer 650, and I/O buffer 660 can provide compute units 680 with data from one or both of the weight buffer 650 and the I/O buffer 660 based on variable amounts of data to be accessed (or sample width) and variable stride lengths between such data. The weights in weight buffer 650 may correspond to weights of a machine learning model loaded into memory for the compute units 680 to use in generating an inference result with respect to an input stored in I/O buffer 660. Both the weights in weight buffer 650 and the input stored in I/O buffer 660 may be organized as matrices, portions of which may be multiplied into an output by compute units 680 and written back to processor memory 610 via write access unit 690. To support accessing variable amounts of data with variable stride lengths between accessed data, the memory in which weight buffer 650 and I/O buffer 660 are located may be organized (e.g., partitioned) into a plurality of logical memory banks, which may be accessed in parallel using a common crossbar, as discussed above. These logical memory banks may have a size corresponding to the width of the underlying physical memory banks in which the data in weight buffer 650 and I/O buffer 660 are stored. Further, as discussed, one or more other layers of larger logical memory banks may be defined to allow for accessing larger amounts of data.

During processing operations by compute units 680, the results of matrix multiplication (or other matrix operations) generated for a subset of data from weight buffer 650 and a subset of data from I/O buffer 660 may be output and written back to I/O buffer 660 (or another buffer, not illustrated in FIG. 6). Thus, intermediate results of matrix operations generated by compute units 680 can remain buffered (e.g., in I/O buffer 660) for access using the variable sample width and variable stride length memory access techniques discussed herein. When operations at compute units 680 are completed, the data in I/O buffer 660 may be output to processor memory 610 via write access unit 690, which may be configured to write a matrix in a linear format (e.g., in row-major or column-major format) for storage and future access.

Figure 7:
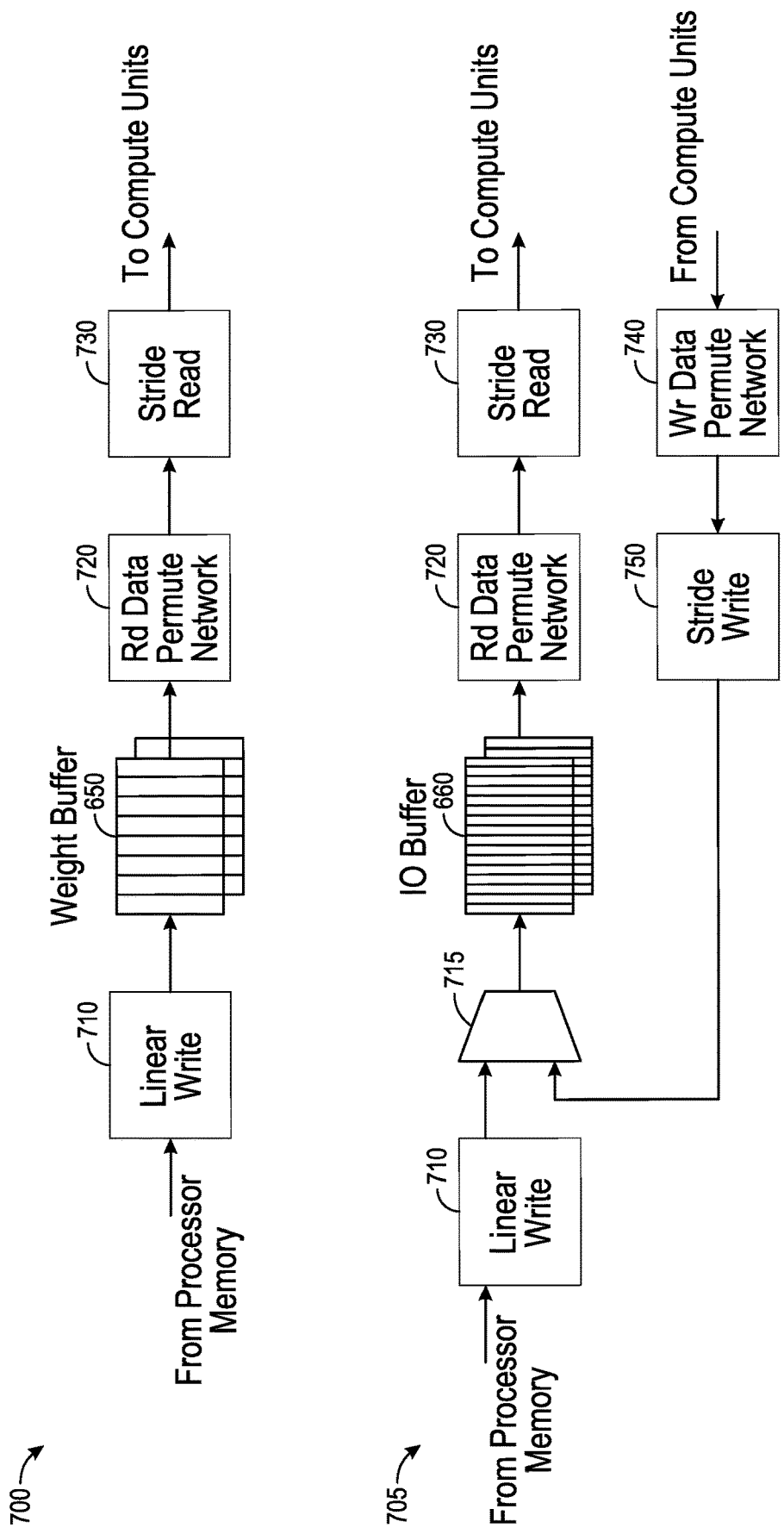
FIG. 7 illustrates details of reading data from processor memory into buffers in which data is accessible via logical memory banks using variable sample width and variable stride length, according to aspects of the present disclosure.

FIG. 7 illustrates details of reading data from processor memory into buffers in which data is accessible via logical memory banks using the variable sample width and variable stride length techniques discussed herein, according to aspects of the present disclosure.

Pipeline 700 illustrates a pipeline for reading static weight data into a weight buffer 650 and providing a subset of weight data from weight buffer 650 to compute units (e.g., compute units 680 illustrated in FIG. 6). Generally, two-dimensional weight matrix data may be stored in processor memory (e.g., processor memory 610 illustrated in FIG. 6) in linear form (e.g., in row-major or column-major format). Linear write block 710 generally converts the weight data from linear form as stored in processor memory to a form that is conducive to variable size and variable stride length access via logical memory banks and a common memory crossbar. After data is stored in weight buffer 650, read access to subsets of data in weight buffer 650 may be performed by read data permute network 720, which uses information about the size (or width) of a data sample requested by a compute unit and a stride length to identify logical memory banks from which data is to be retrieved. The identified logical memory banks may be read by stride read unit 730 and output to the compute unit(s) that use the subset of weight data in one or more matrix operations to generate an intermediate or final output, which may represent a result of an inference.

Pipeline 705 illustrates a pipeline for reading input data and providing a subset of input data from I/O buffer 660 to compute units (e.g., compute units 680 illustrated in FIG. 6). As with the weight data discussed above, input data may also be stored in processor memory (e.g., processor memory 610 illustrated in FIG. 6) in linear form, and linear write block 710 converts the input data from linear form as stored in processor memory to a form that is conducive to variable size and variable stride length access via logical memory banks and a common memory crossbar. After data is stored in I/O buffer 660, read access to subsets of data in I/O buffer 660 may be performed by read data permute network 720, which uses information about the size (or width) of a data sample requested by a compute unit and a stride length to identify logical memory banks from which data is to be retrieved. The identified logical memory banks may be read by stride read unit 730 and output to the compute unit(s) that use the subset of input data in one or more matrix operations to generate an intermediate or final output, which may represent a result of an inference.

In some aspects, the results generated by the compute units based on the subset of input data output to the compute units by stride read unit 730 may be used in subsequent operations performed by these compute units. For example, the results may represent the output of one layer of a machine learning model which is used as input into another layer of the machine learning model. To allow for continued efficiencies in accessing such data, a write data permute network 740 can identify the logical memory blocks in I/O buffer 660 to which data is to be written and the stride length between different locations at which data is to be written. Stride write unit 750 may then write the results generated by the compute units to I/O buffer 660 at the identified addresses, and the read/write process discussed herein may continue while machine learning operations with respect to an input are being performed.

In some aspects, whether data is written to I/O buffer 660 from processor memory via linear write block 710 or from compute units via stride write unit 750 may be controlled by multiplexer 715. For example, multiplexer 715 may be set to allow I/O buffer 660 to be populated with input data from processor memory via linear write block 710 initially. After the input data is written from processor memory to I/O buffer 660, multiplexer 715 may be set to allow I/O buffer 660 to be populated or updated with data from the compute units via stride write unit 750. The multiplexer 715 may generally be set to populate I/O buffer 660 with data from processor memory or from the compute units on an as-demanded basis.

Figure 8:
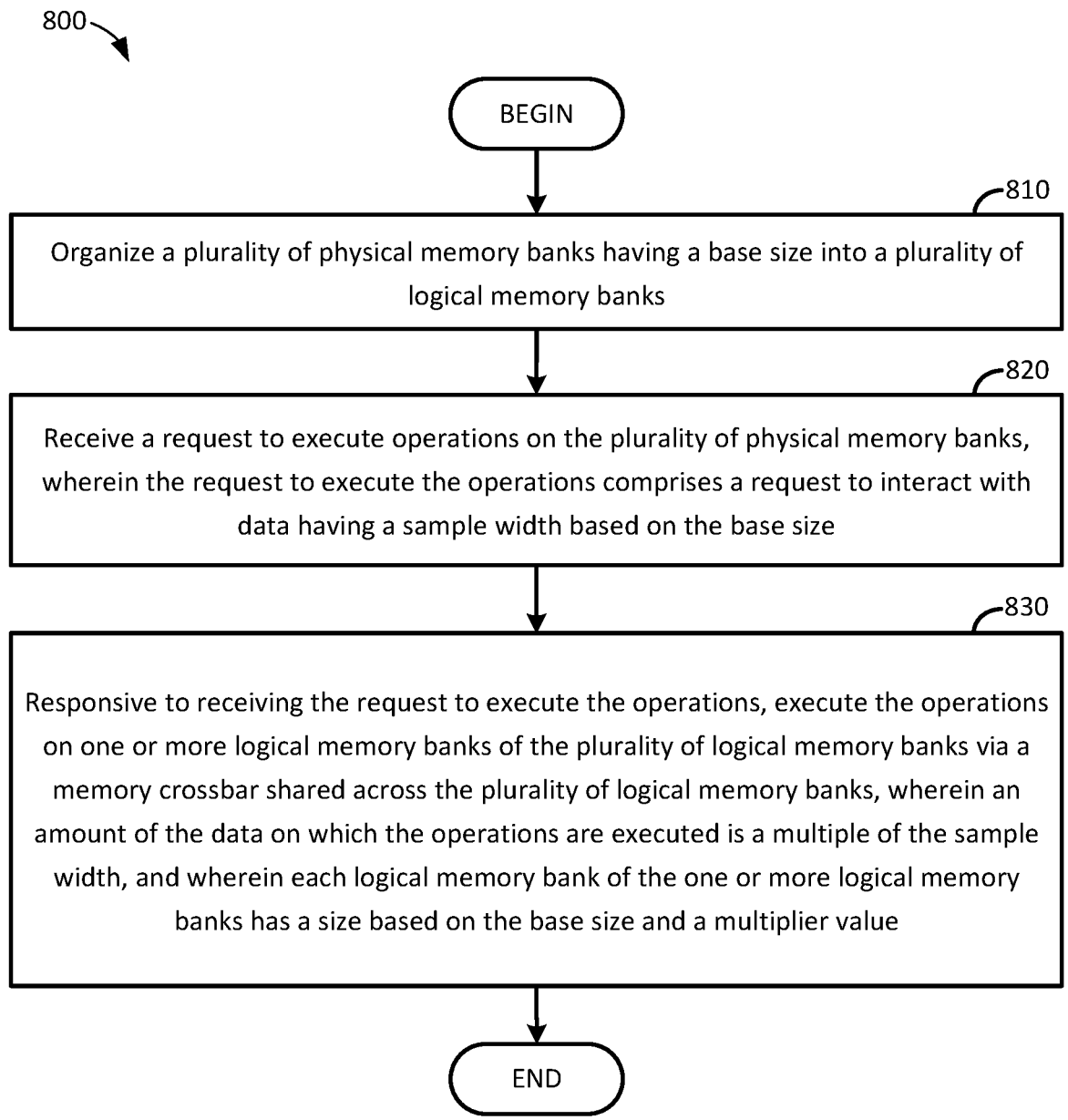
FIG. 8 illustrates example operations for memory organization and access for efficient matrix arithmetic, according to aspects of the present disclosure.

FIG. 8 illustrates example operations 800 for memory organization and access for efficient matrix arithmetic, according to aspects of the present disclosure. Operations 800 may be performed, for example, by a computing device on which matrix arithmetic operations are performed for various tasks, such as processing system 1200 shown in FIG. 12. This computing device may include a user equipment (UE) or other edge device, a server, cloud computing resources, or another device on which matrix math operations are performed (e.g., in training and/or inferencing using machine learning models).

As illustrated, operations 800 may begin at block 810, with organizing a plurality of physical memory banks having a base size into a plurality of logical memory banks.

In some aspects, the plurality of logical memory banks may be structured as an architecture of multiple sets of logical memory banks. A first set of logical memory banks may have a size equal to the base size (as it may not be practicable for logical memory banks to have a size smaller than the size of the underlying physical memory banks). A second set of logical memory banks may have a size double (2×) that of the base size (or some other multiple of the base size). Additional sets of logical memory banks may be defined with increasing sizes (and thus decreasing numbers of memory banks for a given amount of memory); for example, a third set of logical memory banks may have a size quadruple (4×) that of the base size; a fourth set of logical memory banks may have a size octuple (8×) that of the base size; and so on. More generally, the logical banks may provide access to up to M contiguous samples of data, where M is a multiple of a minimum sample width m.

In some aspects, the plurality of physical memory banks may be organized into a plurality of logical memory banks a priori and accessed via a logical bank mode. In some aspects, the organizing (e.g., partitioning) of physical memory banks to logical memory banks may be performed dynamically and in real time in response to determining that such an organization would be useful in accelerating memory access for matrix operations.

At block 820, operations 800 proceed with receiving a request to execute operations on the plurality of physical memory banks, wherein the request to execute the operations comprises a request to interact with data having a sample width based on the base size.

In some aspects, the request to execute operations includes a request to read data from the physical memory banks. In such a case, to execute the operations on the plurality of physical memory banks, data is retrieved from at least one logical memory bank of the second set of logical memory banks via the shared memory crossbar. To retrieve the data from the at least one logical memory bank via the shared crossbar, data is retrieved from logical memory banks of the first set of logical memory banks that form the at least one logical memory bank of the second set of logical memory banks. The retrieved data may be output to one or more compute units configured to process the retrieved data using a machine learning model.

In some aspects, the request to execute operations comprises a request to write data to the plurality of physical memory banks. In such a case, to execute the operations on the plurality of physical memory banks, the data is written to at least one logical memory bank of the second set of logical memory banks via the shared memory crossbar. To write the data to the at least one logical memory bank of the second set of logical memory banks, the data is written to logical memory banks of the first set of logical memory banks that form the at least one logical memory bank of the second set of logical memory banks.

At block 830, responsive to receiving the request to execute the operations, operations 800 proceed with executing the operations on one or more logical memory banks of the plurality of logical memory banks via a memory crossbar shared across the plurality of logical memory banks. An amount of the data on which the operations are executed is a multiple of the sample width, and each logical memory bank of the one or more logical memory banks has a size based on the base size and a multiplier value.

In some aspects, the request to execute the operations on the plurality of physical memory banks is received from one or more compute units configured to process the written data using a machine learning model.

In some aspects, the request to execute the operations on the plurality of physical memory banks is based on data from the one or more compute units or data from a memory associated with a processor, selected via a multiplexer.

In some aspects, operations 800 further include receiving a request to execute other operations on the plurality of physical memory banks. The request to execute the other operations may include a request to interact with other data located in a non-contiguously located physical memory bank relative to the plurality of physical memory banks on which the operations are executed. Responsive to receiving the request to execute the other operations, the other operations are executed on the one or more logical memory banks of the plurality of logical memory banks via the shared memory crossbar.

Example Machine Learning Model Operations

Figure 9:
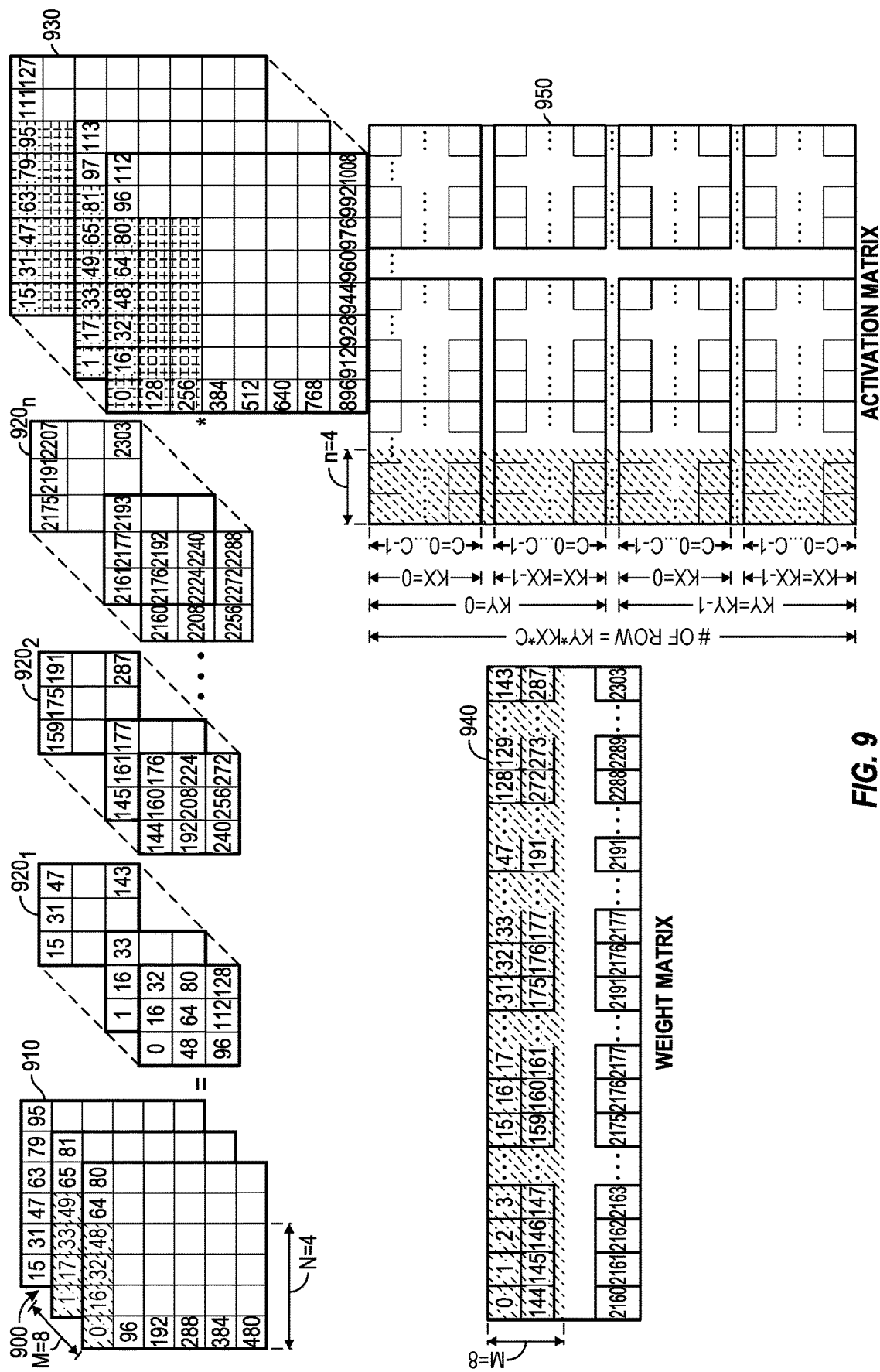
FIG. 9 illustrates an example two-dimensional convolution performed using logical memory banks accessible via a shared memory crossbar, according to aspects of the present disclosure.

FIG. 9 illustrates an example two-dimensional convolution performed using logical memory banks accessible via a shared memory crossbar, according to aspects of the present disclosure. A convolution operation is a common operation performed by layers of a machine learning model during training and inferencing operations.

As illustrated, convolution 900 generates an output 910 based on multiple passes $920_1$-$920_n$, multiplied by an input 930 (or at least a portion of the input 930). Each of these passes $920_1$-$920_n$ corresponds to the application of a different kernel in the neural network to input 930, allowing for the generation of different two-dimensional output planes in output 910. To allow for output 910 to be generated using convolutions performed on data stored in logical memory banks accessible via a shared memory crossbar, a two-dimensional convolution may be decomposed into multiple general matrix multiply (GEMM) operations corresponding to passes $920_1$-$920_n$. Each pass, in some aspects, may generate data based on the application of a different kernel to of a portion of input 930, represented by the shaded portion of input 930, in order to generate values for at least the shaded portions of output 910. Each pass 920 may compute m output channels and n output pixels and may be formulated as an unrolling of each kernel in the neural network as a row in an unrolled weight matrix 940 and unrolling each activation as a column of an unrolled activation matrix 950, where activation duplication can be achieved by reading the same data from memory in different processing cycles. For example, as illustrated, a given pass representing a portion of a two-dimensional convolution may compute m=8 output channels and n=4 output pixels. The m=8 output channels may be generated based on the shaded rows of weight matrix 940, and the n=4 output pixels may be generated based on the shaded columns of the activation matrix 950. The number of GEMM operations into which a two-dimensional convolution may be decomposed may be calculated by the expression:

$$\text{ceiling}\left(\frac{O_c}{m}\right) * \text{ceiling}\left(\frac{O_x}{\left(\frac{sx}{n}\right)}\right) * \text{ceiling}\left(\frac{O_y}{sy}\right)$$

where $O_c$ represents the number of channels in an output, $O_x$ represents the number of pixels in an output on the x axis, sx represents a stride length over the x axis, $O_y$ represents the number of pixels in an output on the y axis, and sy represents a stride length over the y axis.

Figure 10:
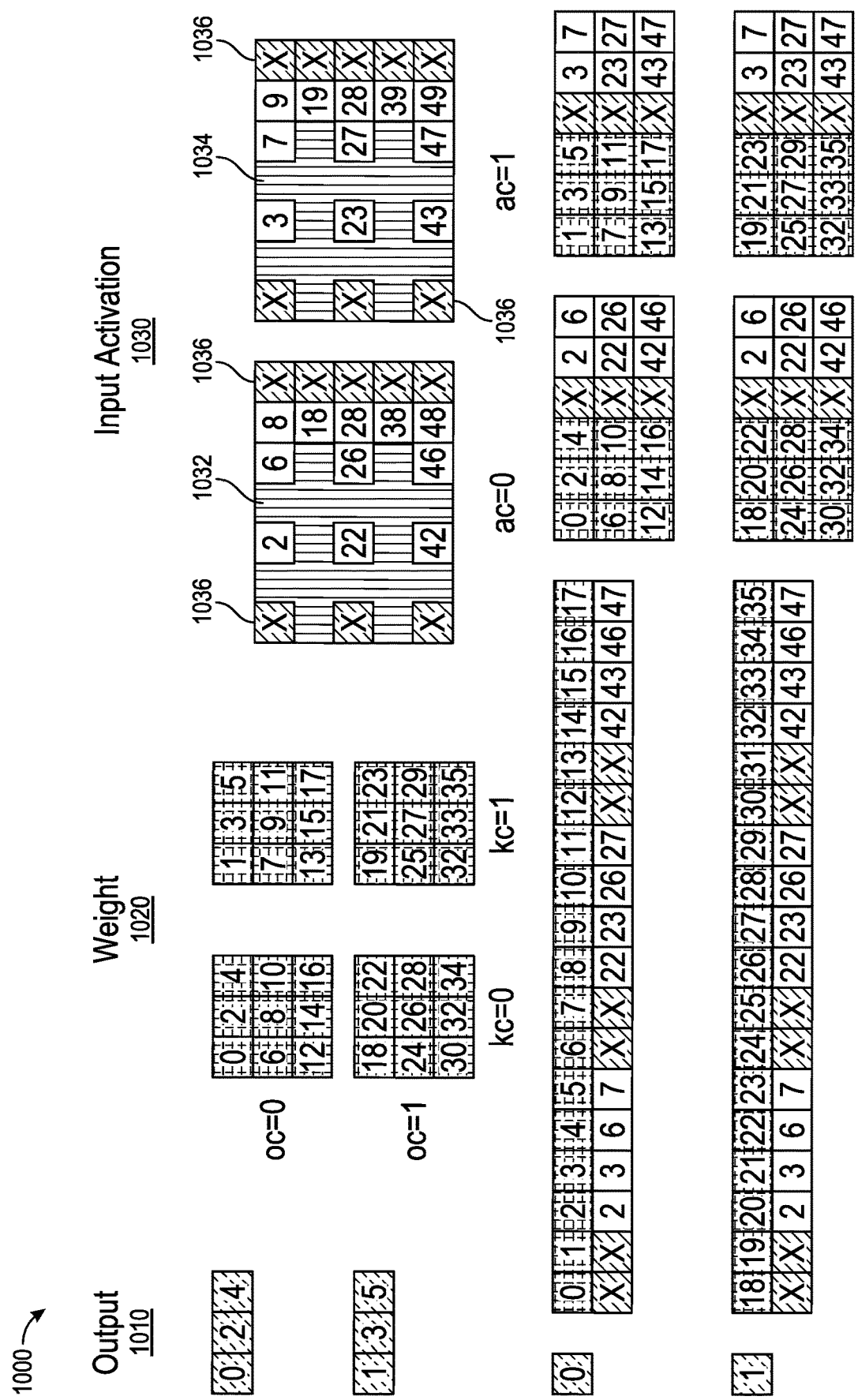
FIG. 10 illustrates an example convolution with dilation and padding performed using logical memory banks accessible via a shared memory crossbar, according to aspects of the present disclosure.

FIG. 10 illustrates an example convolution 1000 with dilation and padding performed using logical memory banks accessible via a shared memory crossbar, according to aspects of the present disclosure.

As illustrated, the output 1010 of convolution 1000 may be based on a product of weight matrices 1020 and input activation matrices 1030. Input activation matrices 1030 may represent a dilated input in which only portions of an input are used in convolution operations. For example, portions 1032, 1034 of input activation matrices 1030 may be omitted from convolution operations, which allows for convolution 1000 to be performed over a larger area of an input activation matrix 1030. In an image processing system, for example, a dilated input may comprise a portion of an image over which certain pixels are disregarded during a convolution operation, based on an assumption that skipping or otherwise disregarding these pixels during convolution operations will not result in significantly degraded inference performance because the skipped pixels generally include information that is similarly captured in the pixels that are used during convolution 1000. The memory access techniques described herein may support the use of dilation and also of padding an input activation matrix with "dummy" bits 1036, which may be bits not originally included in the input activation matrix 1030 but used to pad a matrix into a sufficient size for inference operations including convolution 1000.

Figure 11:
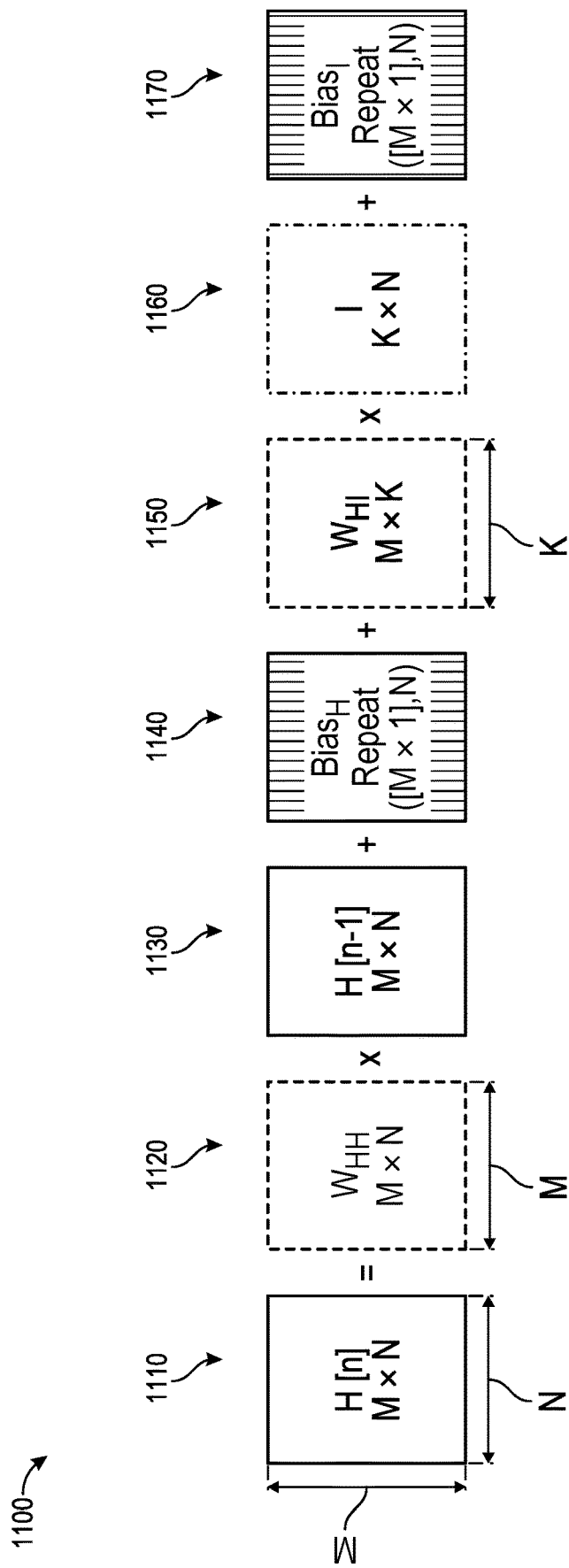
FIG. 11 illustrates an example recurrent neural network (RNN) cell with operations performed using logical memory banks accessible via a shared memory crossbar, according to aspects of the present disclosure.

FIG. 11 illustrates an example recurrent neural network (RNN) cell with operations 1100 performed using logical memory banks accessible via a shared memory crossbar, according to aspects of the present disclosure. RNN cells are generally building blocks for various types of recurrent networks used in applications such as natural language processing, time-series prediction, voice recognition, speech recognition, and the like. These recurrent networks may include gated recurrent units (GRUs), long short-term memory (LSTM) networks, and the like.

As illustrated, operations 1100 in an RNN cell may be decomposed into an output 1110 that is the sum of two different GEMM passes and a vector addition operation performed prior to activation. A first GEMM pass may be, for example, represented as the product of weight matrix 1120 and a hidden layer output 1130. A second GEMM pass may be, for example, represented as the product of weight matrix 1150 and input 1160. The outputs of the first GEMM pass and the second GEMM pass, which may both be matrices, may be added together prior to applying activations on the output 1110. Further, the outputs of the first GEMM pass and the second GEMM pass may be modified by bias matrices 1140 and 1170, respectively.

In some aspects, the inputs into a vector addition operation may be stored in a single memory. In such a case, the memory architecture described herein may allow for simultaneous access to both inputs, which may further accelerate the process of generating an inference using machine learning models operating on such data.

Figure 12:
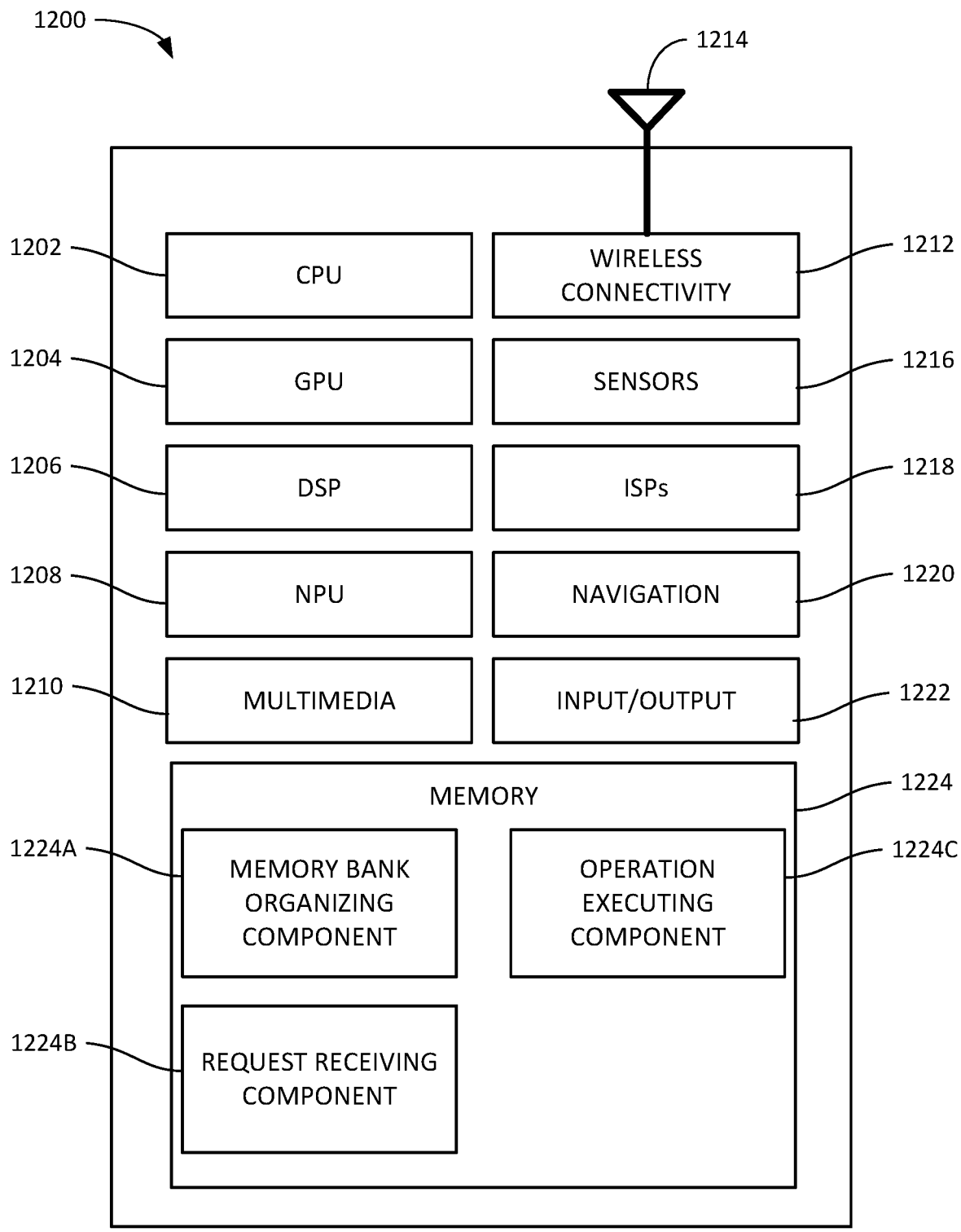
FIG. 12 depicts an example processing system configured to perform various aspects of the present disclosure.

Example Processing Systems for Memory Organization and Access for Efficient Matrix Arithmetic FIG. 12 depicts an example processing system 1200 for memory organization and access for efficient matrix arithmetic, such as described herein for example with respect to FIG. 8.

Processing system 1200 includes a central processing unit (CPU) 1202, which in some examples may be a multi-core CPU. Instructions executed at the CPU 1202 may be loaded, for example, from a program memory associated with the CPU 1202 or may be loaded from a memory partition (e.g., of memory 1224).

Processing system 1200 also includes additional processing components tailored to specific functions, such as a graphics processing unit (GPU) 1204, a digital signal processor (DSP) 1206, a neural processing unit (NPU) 1208, and a connectivity component 1212.

An NPU, such as NPU 1208, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as NPU 1208, are configured to accelerate the performance of common machine learning tasks, such as image classification, machine translation, object detection, and various other predictive models. In some examples, a plurality of NPUs may be instantiated on a single chip, such as a system on a chip (SoC), while in other examples such NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new piece through an already trained model to generate a model output (e.g., an inference).

In one implementation, NPU 1208 is a part of one or more of CPU 1202, GPU 1204, and/or DSP 1206. These may be located on a UE or another computing device.

In some examples, connectivity component 1212 may include subcomponents, for example, for third generation (3G) connectivity, fourth generation (4G) connectivity (e.g., LTE), fifth generation (5G) connectivity (e.g., NR), Wi-Fi connectivity, Bluetooth connectivity, and other wireless data transmission standards. Connectivity component 1212 may be further coupled to one or more antennas 1214.

In some examples, one or more of the processors of processing system 1200 may be based on an ARM or RISC-V instruction set.

Processing system 1200 also includes memory 1224, which is representative of one or more static and/or dynamic memories, such as a dynamic random access memory, a flash-based static memory, and the like. In this example, memory 1224 includes computer-executable components, which may be executed by one or more of the aforementioned processors of processing system 1200.

In particular, in this example, memory 1224 includes memory bank organizing component 1224A, request receiving component 1224B, and operation executing component 1224C. The depicted components, and others not depicted, may be configured to perform various aspects of the methods described herein.

Generally, processing system 1200 and/or components thereof may be configured to perform the methods described herein.

EXAMPLE CLAUSES

Implementation examples are described in the following numbered clauses:

Clause 1: A computer-implemented method, comprising: organizing a plurality of physical memory banks having a base size into a plurality of logical memory banks; receiving a request to execute operations on the plurality of physical memory banks, wherein the request to execute the operations comprises a request to interact with data having a sample width based on the base size; and responsive to receiving the request to execute the operations, executing the operations on one or more logical memory banks of the plurality of logical memory banks via a memory crossbar shared across the plurality of logical memory banks, wherein an amount of the data on which the operations are executed is a multiple of the sample width, and wherein each logical memory bank of the one or more logical memory banks has a size based on the base size and a multiplier value.

Clause 2: The method of Clause 1, wherein the plurality of logical memory banks comprises: a first set of logical memory banks having a size equal to the base size; and a second set of logical memory banks having a size double that of the base size.

Clause 3: The method of Clause 2, wherein: the request to execute operations further comprises a request to read data from the plurality of physical memory banks, executing the operations comprises retrieving the data from at least one logical memory bank of the second set of logical memory banks via the shared memory crossbar, and retrieving the data from the at least one logical memory bank of the second set of logical memory banks comprises retrieving the data from logical memory banks of the first set of logical memory banks that form the at least one logical memory bank of the second set of logical memory banks.

Clause 4: The method of Clause 3, further comprising outputting the retrieved data to one or more compute units configured to process the retrieved data using a machine learning model.

Clause 5: The method of Clause 2, wherein: the request to execute operations comprises a request to write data to the plurality of physical memory banks, executing the operations comprises writing the data to at least one logical memory bank of the second set of logical memory banks via the shared memory crossbar, and writing the data to the at least one logical memory bank of the second set of logical memory banks comprises writing the data to logical memory banks of the first set of logical memory banks that form the at least one logical memory bank of the second set of logical memory banks Clause 6: The method of Clause 5, wherein the request to execute the operations on the plurality of physical memory banks is received from one or more compute units configured to process the written data using a machine learning model.

Clause 7: The method of Clause 6, wherein the request to execute the operations on the plurality of physical memory banks is based on data from the one or more compute units or data from a memory associated with a processor, selected via a multiplexer.

Clause 8: The method of any of Clauses 1 through 7, further comprising: receiving a request to execute other operations on the plurality of physical memory banks, wherein the request to execute the other operations comprises a request to interact with other data located in a non-contiguously located physical memory bank relative to the plurality of physical memory banks on which the operations are executed; and responsive to receiving the request to execute the other operations, executing the other operations on the one or more logical memory banks of the plurality of logical memory banks via the shared memory crossbar.

Clause 9: A system, comprising: a memory having executable instructions stored thereon; and a processor configured to execute the executable instructions in order to cause the system to perform the operations of any of Clauses 1 through 8.

Clause 10: A system, comprising means for performing the operations of any of Clauses 1 through 8.

Clause 11: A computer-readable medium having instructions stored thereon which, when executed by a processor, perform the operations of any of Clauses 1 through 8.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
organizing a plurality of physical memory banks having a base size into a plurality of logical memory banks that comprise a first set of logical memory banks having a size equal to the base size and a second set of logical memory banks having a size double that of the base size;
receiving a request to execute operations on the plurality of physical memory banks, wherein the request to execute the operations comprises a request to interact with data having a sample width based on the base size and a request to read the data from the plurality of physical memory banks; and
responsive to receiving the request to execute the operations, executing the operations on one or more logical memory banks of the plurality of logical memory banks via a memory crossbar shared across the plurality of logical memory banks, wherein an amount of the data on which the operations are executed is a multiple of the sample width, wherein each logical memory bank of the one or more logical memory banks has a size based on the base size and a multiplier value, wherein executing the operations comprises retrieving the data from at least one first logical memory bank of the second set of logical memory banks via the shared memory crossbar, and wherein retrieving the data from the at least one first logical memory bank of the second set of logical memory banks comprises retrieving the data from logical memory banks of the first set of logical memory banks that form the at least one first logical memory bank of the second set of logical memory banks.

2. The method of claim 1, further comprising outputting the retrieved data to one or more compute units configured to process the retrieved data using a machine learning model.

3. The method of claim 1, wherein:
the request to execute operations further comprises a request to write the data to the plurality of physical memory banks,
executing the operations further comprises writing the data to at least one second logical memory bank of the second set of logical memory banks via the shared memory crossbar, and
writing the data to the at least one second logical memory bank of the second set of logical memory banks comprises writing the data to logical memory banks of the first set of logical memory banks that form the at least one second logical memory bank of the second set of logical memory banks.

4. The method of claim 3, wherein the request to execute the operations on the plurality of physical memory banks is received from one or more compute units configured to process the written data using a machine learning model.

5. The method of claim 4, wherein the request to execute the operations on the plurality of physical memory banks is based on data from the one or more compute units or data from a memory associated with a processor, selected via a multiplexer.

6. The method of claim 1, further comprising:
receiving a request to execute other operations on the plurality of physical memory banks, wherein the request to execute the other operations comprises a request to interact with other data located in a non-contiguously located physical memory bank relative to the plurality of physical memory banks on which the operations are executed; and
responsive to receiving the request to execute the other operations, executing the other operations on the one or more logical memory banks of the plurality of logical memory banks via the shared memory crossbar.

7. A system, comprising:
memory having executable instructions stored thereon; and
one or more processors configured, individually or collectively, to execute the executable instructions in order to cause the system to:
organize a plurality of physical memory banks having a base size into a plurality of logical memory banks that comprise a first set of logical memory banks having a size equal to the base size and a second set of logical memory banks having a size double that of the base size;
receive a request to execute operations on the plurality of physical memory banks, wherein the request to execute the operations comprises a request to interact with data having a sample width based on the base size and a request to read the data from the plurality of physical memory banks; and
responsive to receiving the request to execute the operations, execute the operations on one or more logical memory banks of the plurality of logical memory banks via a memory crossbar shared across the plurality of logical memory banks, wherein an amount of the data on which the operations are executed is a multiple of the sample width, wherein each logical memory bank of the one or more logical memory banks has a size based on the base size and a multiplier value, wherein in order to execute the operations, the one or more processors are configured, individually or collectively, to cause the system to retrieve the data from at least one first logical memory bank of the second set of logical memory banks via the shared memory crossbar, and wherein in order to retrieve the data from the at least one first logical memory bank of the second set of logical memory banks, the one or more processors are configured, individually or collectively, to cause the system to retrieve the data from logical memory banks of the first set of logical memory banks that form the at least one first logical memory bank of the second set of logical memory banks.

8. The system of claim 7, wherein the one or more processors are further configured, individually or collectively, to cause the system to output the retrieved data to one or more compute units configured to process the retrieved data using a machine learning model.

9. The system of claim 7, wherein:
the request to execute operations further comprises a request to write the data to the plurality of physical memory banks,
in order to execute the operations, the one or more processors are further configured, individually or collectively, to cause the system to write the data to at least one second logical memory bank of the second set of logical memory banks via the shared memory crossbar, and in order to write the data to the at least one second logical memory bank of the second set of logical memory banks, the one or more processors are further configured, individually or collectively, to write the data to logical memory banks of the first set of logical memory banks that form the at least one second logical memory bank of the second set of logical memory banks.

10. The system of claim 9, wherein the request to execute the operations on the plurality of physical memory banks is received from one or more compute units configured to process the written data using a machine learning model.

11. The system of claim 10, wherein the request to execute the operations on the plurality of physical memory banks is based on data from the one or more compute units or data from another memory associated with the one or more processors, selected via a multiplexer.

12. The system of claim 7, wherein the one or more processors are further configured, individually or collectively, to cause the system to:
receive a request to execute other operations on the plurality of physical memory banks, wherein the request to execute the other operations comprises a request to interact with other data located in a non-contiguously located physical memory bank relative to the plurality of physical memory banks on which the operations are executed; and
responsive to receiving the request to execute the other operations, execute the other operations on the one or more logical memory banks of the plurality of logical memory banks via the shared memory crossbar.

13. A system, comprising:
means for organizing a plurality of physical memory banks having a base size into a plurality of logical memory banks that comprise a first set of logical memory banks having a size equal to the base size and a second set of logical memory banks having a size double that of the base size;
means for receiving a request to execute operations on the plurality of physical memory banks, wherein the request to execute the operations comprises a request to interact with data having a sample width based on the base size and a request to read the data from the plurality of physical memory banks; and
means for executing, responsive to receiving the request to execute the operations, the operations on one or more logical memory banks of the plurality of logical memory banks via a memory crossbar shared across the plurality of logical memory banks, wherein an amount of the data on which the operations are executed is a multiple of the sample width, wherein each logical memory bank of the one or more logical memory banks has a size based on the base size and a multiplier value, wherein the means for executing the operations comprises means for retrieving the data from at least one first logical memory bank of the second set of logical memory banks via the shared memory crossbar, and wherein the means for retrieving the data from the at least one first logical memory bank of the second set of logical memory banks comprises means for retrieving the data from logical memory banks of the first set of logical memory banks that form the at least one first logical memory bank of the second set of logical memory banks.

14. The system of claim 13, further comprising means for outputting the retrieved data to one or more compute units configured to process the retrieved data using a machine learning model.

15. The system of claim 13, wherein:
the request to execute operations further comprises a request to write the data to the plurality of physical memory banks,
the means for executing the operations further comprises means for writing the data to at least one second logical memory bank of the second set of logical memory banks via the shared memory crossbar, and
the means for writing the data to the at least one second logical memory bank of the second set of logical memory banks further comprises means for writing the data to logical memory banks of the first set of logical memory banks that form the at least one second logical memory bank of the second set of logical memory banks.

16. The system of claim 15, wherein the means for receiving the request to execute the operations on the plurality of physical memory banks comprises means for receiving the request from one or more compute units configured to process the written data using a machine learning model.

17. The system of claim 16, wherein the request to execute the operations on the plurality of physical memory banks is based on data from the one or more compute units or data from memory associated with one or more processors, selected via a multiplexer.

18. The system of claim 13, further comprising:
means for receiving a request to execute other operations on the plurality of physical memory banks, wherein the request to execute the other operations comprises a request to interact with other data located in a non-contiguously located physical memory bank relative to the plurality of physical memory banks on which the operations are executed; and
means for executing, responsive to receiving the request to execute the other operations, the other operations on the one or more logical memory banks of the plurality of logical memory banks via the shared memory crossbar.

19. A non-transitory computer-readable medium having instructions stored thereon which, when executed by one or more processors individually or collectively, perform an operation comprising:
organizing a plurality of physical memory banks having a base size into a plurality of logical memory banks that comprise a first set of logical memory banks having a size equal to the base size and a second set of logical memory banks having a size double that of the base size;
receiving a request to execute operations on the plurality of physical memory banks, wherein the request to execute the operations comprises a request to interact with data having a sample width based on the base size and a request to read the data from the plurality of physical memory banks; and
responsive to receiving the request to execute the operations, executing the operations on one or more logical memory banks of the plurality of logical memory banks via a memory crossbar shared across the plurality of logical memory banks, wherein an amount of the data on which the operations are executed is a multiple of the sample width, wherein each logical memory bank of the one or more logical memory banks has a size based on the base size and a multiplier value, wherein executing the operations comprises retrieving the data from at least one first logical memory bank of the second set of logical memory banks via the shared memory crossbar, and wherein retrieving the data from the at least one first logical memory bank of the second set of logical memory banks comprises retrieving the data from logical memory banks of the first set of logical memory banks that form the at least one first logical memory bank of the second set of logical memory banks.

\* \* \* \* \*